R. DIESEL.
FLUID ACTUATED CLUTCH.
APPLICATION FILED OCT. 17, 1910.
1,018,412.
Patented Feb. 27, 1912.
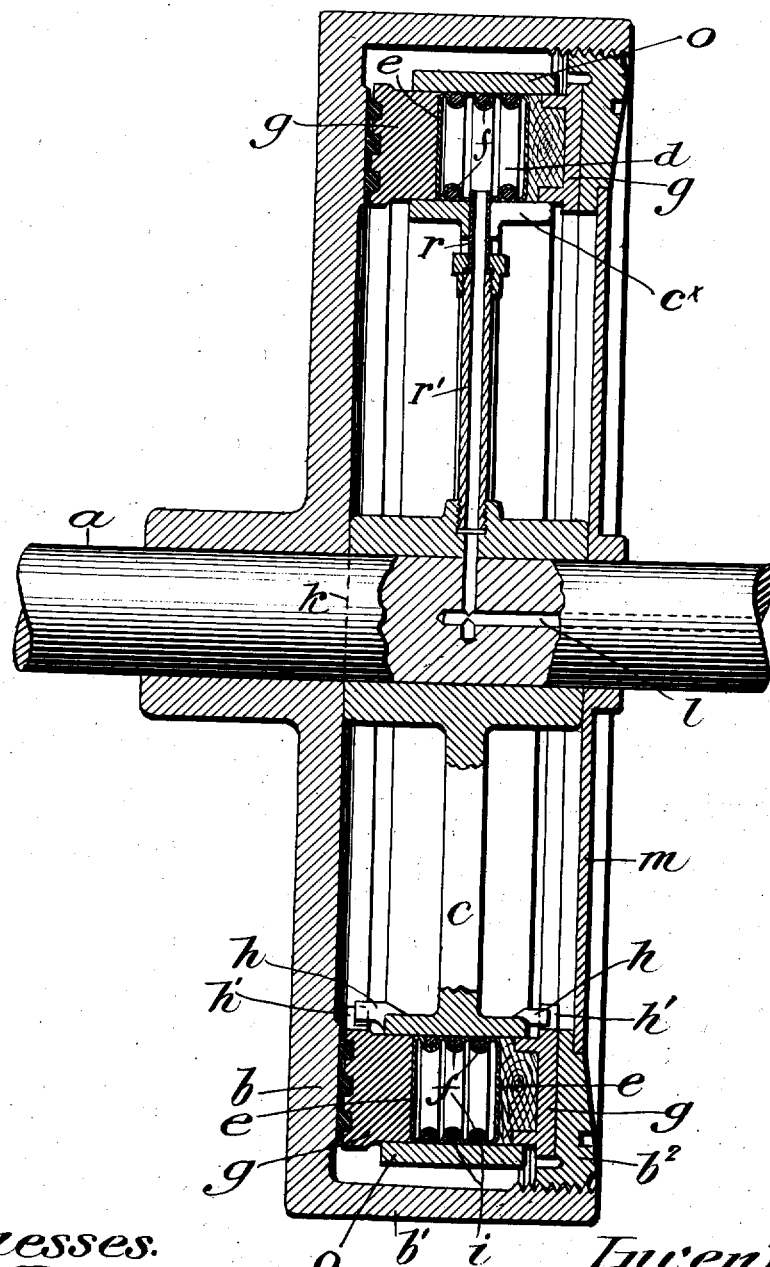

UNITED STATES PATENT OFFICE.

RUDOLF DIESEL, OF MUNICH, GERMANY.

FLUID-ACTUATED CLUTCH.

1,018,412.  Specification of Letters Patent.  Patented Feb. 27, 1912.

Application filed October 17, 1910. Serial No. 587,514.

*To all whom it may concern:*

Be it known that I, RUDOLF DIESEL, a subject of the King of Bavaria, residing at 32 Maria Theresia strasse, Munich, in the Kingdom of Bavaria, Germany, engineer, have invented certain new and useful Improvements in Fluid-Actuated Clutches, of which the following is a specification.

The invention relates to friction or other clutches, brakes or the like, in which the engagement of the two members is effected by an elastic hollow body loosely inserted between two members and made to engage same when required by admitting a fluid under pressure to the hollow body and so causing it to expand.

Couplings of this description are already known, but in these the elastic hollow body has always been made of materials which allow the necessary expansion of the same on the admission of the fluid under pressure only by the elastic expansion of the material itself; there are, however, only very few of such materials which are suitable, in fact only rubber and perhaps leather. The durability of these materials however is not such that the hollow bodies made of the same can be considered as reliable machine parts, and besides this they wear out very quickly owing to the heat caused by the friction and to the lubricating oil.

The present invention relates to friction clutches, brakes or the like in which the principle of the loosely inserted hollow body is retained, but in which this body is made of rigid and not in itself expanding material, the movement of the walls of the hollow body being due not to the expansion of their material but to the special form given to them. The materials used are in general metals, from which the most suitable and reliable for the purpose can be chosen.

A practical form of the improved coupling is illustrated in the accompanying drawing, in which the figure is a vertical section through the coupling as applied to a clutch.

Referring to the drawing $a$ indicates a shaft upon which is loosely mounted a housing $b$ which, as shown, is in the form of a hollow drum-like casting having an annular flange $b'$, in which is adjustably secured, by means of suitable screw threads, an annulus $b^2$. The inner faces of the housing $b$ and annulus $b^2$ serve as bearing surfaces against which the moving parts of the coupling members engage, as will be hereinafter more particularly explained. The housing $b$ may obviously take the form of a pulley as shown in the drawings or it may be provided with teeth to form a gear and in fact it may be given any desired form for effecting transmission of power, or in the alternative, if said housing be held in fixed position by any suitable means, it will serve as the abutment or anchoring member of a brake, or stop mechanism. Keyed, or otherwise suitably connected to the shaft $a$ is a coupling disk $c$ on the periphery of which is carried an elastic pressure receiving body $d$. This body is preferably held on the rim of the disk $c$ by friction, it being slipped over such rim from the side. The body is provided with a short inlet pipe $r$ which, when the body is placed in the aforesaid position, moves into a suitable cut-out portion $c^x$ in the rim of the disk, as shown. The pipe $r$ is then connected in a suitable manner, as by the pipe or tube $r'$ with the conduit $l$ extending axially through the shaft $a$, from which conduit the pressure medium is supplied to the annular pressure body $d$ in an obvious manner. In order to prevent dust and metal particles, which accumulate in the coupling device in the course of time, from reaching the hollow pressure body, a protecting ring $o$ is preferably slipped over the latter, as shown. This ring also serves to prevent the collapse of the hollow body when the pressure medium is withdrawn therefrom. However, this ring or its equivalent may be dispensed with under certain conditions.

In its preferred form the body $d$ is constructed with walls of thin sheet metal in such manner that the two lateral faces $e$ are substantially rigid and flat and have a uniform bearing upon the back faces of friction blocks or shoes $g$, $g$, which are likewise mounted on the periphery of the disk $c$. The peripheral walls of the hollow body are provided with a series of convolutions or folds $f, f$, which impart to said body a bellows-like form permitting the same to expand laterally upon the admission of pressure medium to the interior thereof. By reason of this elongation of the body in an axial direction, the necessary movement of the blocks $g, g$ against the friction surfaces of the housing $b$ and annulus $b^2$ is effected, and the change in the formation of the body is not due to the inherent quality of expansibility in the walls themselves, but rather to the particular formation of the convoluted peripheral walls. In order to prevent a flattening out of the convolutions of the peripheral walls of the body $d$, said walls are, in case of necessity, reinforced by means of wires $i$ or the like secured within the convolutions. These wires are laid in the convolutions of the hollow body, and the ends of each are secured together as by soldering or welding in order to form complete rings. When the convolutions are pressed outward by the interior pressure the resulting tension will be taken up by the wires, and therefore the corrugated or convoluted walls retain their shape, without being pressed flat or damaged by the internal pressure. Of course it will be understood that if a protecting ring $o$ is used, as shown, dust and the like cannot lodge in the convolutions in the outer wall of the body, nor in the spaces between the wires on the outer surface of the body.

It will be noted that the pressure body $d$ transmits no tangential force relative to the housing $b$, because of the fact that the friction blocks $g, g$ are connected to and move with the disk $c$ and chamber $d$ in a rotary direction, by reason of the engagement of the lugs $h$ carried by disk $c$ with lugs $h'$ on the friction blocks $g, g$. Any slip or lost motion between the coupling members $b$ and $c$ will be taken up between the bearing surfaces on the members $b$ and $b^2$ and the friction blocks $g, g$, and will not be transmitted to the pressure chamber $d$, so that the latter is not subjected to frictional wear or tangential strains. It will be apparent that, in order to operate the coupling, to connect housing $b$ for rotary motion with the shaft $a$, it will only be necessary to admit fluid pressure, either in the form of compressed air, steam, or a suitable liquid medium into the pressure body $d$, by way of duct $l$. The effect of such admission will be to expand body $d$ in a lateral direction, such expansion being permitted by the corrugated or bellows-shaped peripheral walls of the chamber. The lateral expansion of the body $d$ will force the friction blocks $g, g$ into engagement with the coöperating faces on the housing $b$ and the annulus $b^2$ and securely lock the parts $b$ and $c$ together.

Should the apparatus be employed to connect two alining shafts, as would be produced, for example, by the division of shaft $a$ along dotted line $k$, it would only be necessary to connect each of the coupling members $b$ and $c$ rigidly to its corresponding shaft section.

What I claim is:—

1. Coupling mechanism for power transmitting apparatus, comprising relatively movable coupling members, and a fluid pressure device located between said coupling members for operatively connecting the same, said pressure device comprising a hollow body having a substantially rigid wall on its engaging face and extensible walls parallel with the direction of movement of the rigid wall.

2. Coupling mechanism for power transmitting apparatus, comprising relatively movable coupling members, and a fluid pressure device loosely located between said coupling members for operatively connecting the same without itself transmitting tangential strains, said pressure device comprising a hollow body having a substantially rigid wall on its engaging face and corrugated or folded walls parallel with the direction of movement of the rigid wall.

3. Coupling mechanism for power transmitting apparatus, comprising two relatively movable coupling members, and a fluid pressure device for operatively connecting said members without transmitting tangential strains, said device including a hollow sheet metal body carried by one member, said body having a substantially rigid frictional engaging face and extensible corrugated walls disposed substantially at right angles to said engaging face.

4. Coupling mechanism for power transmitting apparatus, comprising a shaft, relatively movable members mounted thereon, said members having coöperating coupling elements, and a fluid pressure device carried by one member for operatively connecting said coupling elements without itself transmitting tangential strains, said device including a hollow sheet metal body carried by one of said members and having a substantially rigid wall engaging the coupling element carried by said member and corrugated extensible walls parallel with the direction of movement of said rigid wall.

5. A coupling, comprising two adjacent relatively rotary members, a hollow annular body carried by one of said members, said body having a plain lateral wall and corrugated peripheral walls and a movable frictional block mounted adjacent said lateral wall of said body and adapted to be forced by the expansion of said body into engagement with the coöperating coupling member.

6. In a coupling mechanism such as described, a hollow expansible body having a bellows-shaped wall, and means interposed between the convolutions of said wall to prevent the flattening of the latter under internal pressure.

In testimony whereof I have signed my name to this specification in the presence of two subscribing witnesses.

RUDOLF DIESEL.

Witnesses:
A. V. W. COTTER,
MATHILDE K. HELD.